United States Patent [19]
Nishida

[11] Patent Number: 4,552,282
[45] Date of Patent: Nov. 12, 1985

[54] STRUCTURE FOR RETAINING TANK CAP

[75] Inventor: Hiroshi Nishida, Miki, Japan

[73] Assignee: Kawasaki Jukogyo Kabushiki Kaisha, Japan

[21] Appl. No.: 693,096

[22] Filed: Jan. 22, 1985

[30] Foreign Application Priority Data

Jan. 25, 1984 [JP] Japan ................................ 59-8689[U]

[51] Int. Cl.⁴ ........................ B65D 1/24; B65D 1/36; B65D 57/00
[52] U.S. Cl. ................................ 220/20; 220/85 CH; 220/380; 220/284
[58] Field of Search ................ 215/215, 295; 220/200, 220/284, 20, 85 CH, 380

[56] References Cited

U.S. PATENT DOCUMENTS

| | | | |
|---|---|---|---|
| 3,409,159 | 11/1968 | Velt | 215/215 |
| 3,625,386 | 12/1971 | Schaefer | 215/215 |
| 3,744,654 | 7/1973 | Bromberg | 215/215 |
| 4,370,998 | 2/1983 | Kimpara | 220/20 |

*Primary Examiner*—George T. Hall
*Attorney, Agent, or Firm*—Leydig, Voit & Mayer

[57] ABSTRACT

Disclosed is a tank cap retaining structure which may be applied to a machine in which a plurality of tanks, such as a fuel tank and an oil tank, are disposed side by side. The respective outer surfaces of the associated caps of the tanks are formed such as to be capable of detachably engaging each other. Thus, at the time of supply of fuel or oil, there is no possibility that the tank cap in question may be lost or contaminated.

6 Claims, 11 Drawing Figures

STRUCTURE FOR RETAINING TANK CAP

BACKGROUND OF THE INVENTION

1. Field of the Invention:

The present invention relates to a tank cap retaining structure for use in a motorcycle, a small-sized motorized marine craft or an agricultural machine in which a plurality of tanks, such as a fuel tank and an oil tank, are disposed side by side.

2. Description of the Prior Art:

In a motorcycle equipped with a two-cycle engine, a small-sized motorized marine craft or machines for various types of agricultural work, it is general practice to provide a tank for storing oil for lubricating various portions of an engine, in addition to a fuel tank for storing gasoline.

For example, in motor scooters, which have rapidly increased in number recently, a fuel tank and an oil tank are disposed side by side below the seat. In the small-sized water-jet propulsion marine craft which has been developed by the company of the applicant of the present invention, a fuel tank and an oil tank are disposed side by side in the upper portion of the hull on the forward side thereof. The same is the case with general-purpose engines which are employed in various agricultural machines, such as a lawn mower and a powered pest control machine.

When fuel or oil is to be supplied into the fuel or oil tank, the associated tank cap is removed, and, in such a case, care must be taken not to lose or contaminate the tank cap removed. In particular, a small-sized marine craft often needs to be supplied with fuel, such as gasoline, at a sandy seashore or waterfront. In such a case, sand easily attaches to the tank cap after its removal, and it inconveniently takes much time and effort to remove the sand. Further, sand may enter the tank, which fact may lead to clogging of the fuel passage.

To cope with the above-described problems, a means has heretofore been proposed in which a tank cap is connected to the associated tank body by a chain so that they are linked together. This means, however, suffers the following disadvantages: there is a possibility of disconnection of the chain; and it is very difficult to supply fuel or oil into the tank since the chain is always present at the inlet of the tank. (Examples of the prior art are disclosed in Japanese Utility Model Publication No. 45819/81).

SUMMARY OF THE INVENTION

It is a primary object of the present invention to provide a tank cap retaining structure which is simple and free from the possibility that a tank cap may be lost at the time of supply of fuel or oil, thereby overcoming the above-described disadvantages of the prior art.

The tank cap retaining structure according to the invention may be applied to a machine in which a plurality of tanks, such as a fuel tank and an oil tank, are disposed side by side. One of a plurality of tank caps has a recess or a projection formed on its outer surface, while another tank cap has on its outer surface a projection or a recess which is designed such as to be capable of detachably engaging the above-described recess or projection. When a fuel or an oil is to be supplied into any one of the tanks, the cap associated with the tank concerned is removed therefrom and can be retained on the cap of another tank. Thus, the present invention offers an advantage that there is no possibility of losing or contamination of the tank caps.

BRIEF DESCRIPTION OF THE DRAWINGS

FIGS. 2a and 2b in combination show a first embodiment of the present invention, in which: FIG. 2a is a sectional view of a tank cap of an oil tank; and FIG. 2b is a sectional view of a tank cap of a fuel tank;

DESCRIPTION OF THE PREFERRED EMBODIMENTS

Figure 1:
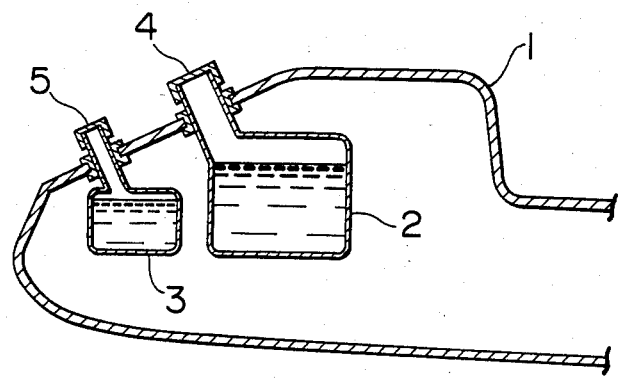
FIG. 1 is a schematic sectional view of a tank portion of a small-sized marine craft.

Referring first to FIG. 1 which is a sectional view of a tank portion of a small-sized marine craft, the reference numeral 1 denotes the hull of the craft, 2 a fuel tank, and 3 an oil tank. The fuel and oil tanks 2, 3 are generally disposed side by side in close proximity to each other. The reference numerals 4 and 5 represent the respective tank caps of the fuel and oil tanks 2, 3.

Figure 2A:
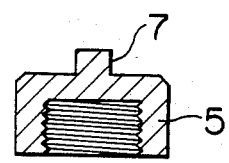
Figure 2B:
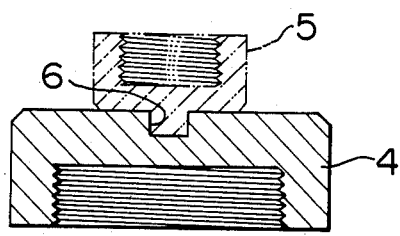

(1) First Embodiment:

FIGS. 2a and 2b in combination show a first embodiment of the tank cap retaining structure according to the present invention. FIG. 2a is a sectional view of the tank cap 5 of the oil tank 3 (see FIG. 1), while FIG. 2b is a sectional view of the tank cap 4 of the fuel tank 2 (see FIG. 1). As shown in these Figures, a recess 6 is formed in the center of the upper surface of the tank cap 4, and a projection 7 is formed in the center of the upper surface of the tank cap 5. The projection 7 is, as shown by the two-dot chain line in FIG. 2b, fitted into the recess 6 formed in the center of the upper surface of the tank cap 4 of the fuel tank 2.

Thus, to supply gasoline into the fuel tank 2, the tank cap 4 of the fuel tank 2 is removed and retained on the tank cap 5 in such a manner that the recess 6 of the tank cap 4 is fitted with the projection 7 formed in the center of the upper surface of the tank cap 5 of the oil tank 3. To supply oil into the oil tank 3, on the other hand, the tank cap 5 of the oil tank 3 is removed and retained on the tank cap 4 in such a manner that the projection 7 of the tank cap 5 is fitted into the recess 6 formed in the center of the upper surface of the tank cap 4 of the fuel tank 2.

Figure 3A:
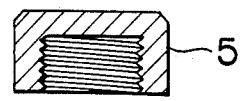
FIGS. 3a and 3b are sectional views of a second embodiment of the present invention.
Figure 3B:
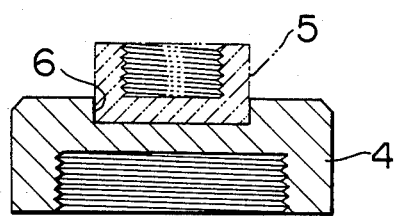

(2) Second Embodiment:

Referring next to FIGS. 3a and 3b, there is shown a second embodiment of the tank cap retaining structure according to the present invention. In a manner similar to that of the above-described first embodiment, FIG. 3a is a sectional view of the tank cap 5 of the oil tank 3, while FIG. 3b is a sectional view of the tank cap 4 of the fuel tank 2.

In FIGS. 3a and 3b, the same reference numerals as those in FIGS. 2a and 2b denote the same members or portions, and detailed description thereof is omitted. In this embodiment, no special projection is formed on the upper surface of the tank cap 5 of the oil tank 3, and the tank cap 5 itself is designed such as to serve as the projection 7 (shown in FIG. 2a) in the first embodiment. For this reason, in the center of the upper surface of the tank cap 4 of the fuel tank 2 is formed a relatively large recess 6 so that it can receive the body of the tank cap 5 of the oil tank 3.

The tank caps in accordance with this embodiment are used in the same manner as that in the first embodiment and, therefore, description of the action and effect thereof is omitted.

Figure 4A:
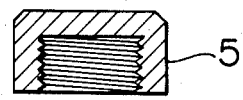
FIGS. 4a and 4b are sectional views of a third embodiment of the present invention.
Figure 4B:
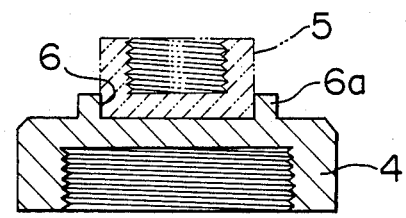

(3) Third Embodiment:

FIGS. 4a and 4b in combination show a third embodiment of the tank cap retaining structure according to the present invention. This embodiment is a modification of what is shown in FIGS. 3a and 3b. In this third embodiment, an annular wall 6a is integrally formed on the upper surface of the tank cap 4 of the fuel tank 2 such as to define the recess 6 for receiving the tank cap 5 of the oil tank 3.

The construction of the other portions in this embodiment and the action thereof are the same as those in the above-described second embodiment and, therefore, detailed description thereof is omitted.

Figure 5A:
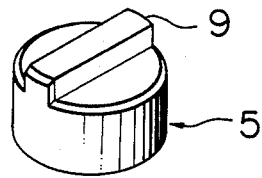
FIGS. 5a and 5b are sectional views of a fourth embodiment of the present invention.
Figure 5B:
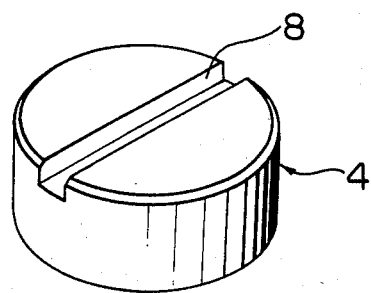

(4) Fourth Embodiment:

A fourth embodiment of the tank cap retaining structure according to the present invention is shown in FIGS. 5a and 5b, in which: FIG. 5a is a perspective view of the tank cap 5 of the oil tank 3; and FIG. 5b is a perspective view of the tank cap 4 of the fuel tank 2. As shown in these Figures, a fitting groove 8 is formed on the upper surface of the tank cap 4, and a ridge 9 is formed on the upper surface of the tank cap 5, the ridge 9 and fitting groove 8 being designed such as to be engageable with each other.

Thus, to supply gasoline into the fuel tank 2, the tank cap 4 of the fuel tank 2 is removed and retained on the tank cap 5 in such a manner that the fitting groove 8 of the tank cap 4 is slide-fitted with the ridge 9 formed on the tank cap 5 of the oil tank 3. To supply oil into the oil tank 3, on the other hand, the tank cap 5 of the oil tank 3 is removed and retained on the tank cap 4 in such a manner that the ridge 9 of the tank cap 5 is slide-fitted in the fitting groove 8 formed on the tank cap 4 of the fuel tank 2.

Figure 6A:
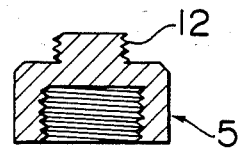
FIGS. 6a and 6b are sectional views of a fifth embodiment of the present invention.
Figure 6B:
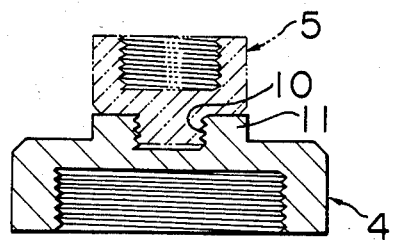

(5) Fifth Embodiment:

Referring now to FIGS. 6a and 6b, there is shown a fifth embodiment of the tank cap retaining structure according to the present invention. FIG. 6a is a sectional view of the tank cap 5 of the oil tank 3, while FIG. 6b is a sectional view of the tank cap 4 of the fuel tank 2. In these Figures, the reference numeral 10 denotes an internally threaded recess provided inside a projection 11 formed in the center of the upper surface of the tank cap 4, while the numeral 12 represents an externally threaded projection formed in the center of the upper surface of the tank cap 5. The externally threaded projection 12 and the internally threaded recess 10 are designed such as to enable one to be screwed onto the other.

Thus, to supply gasoline into the fuel tank 2, the tank cap 4 of the fuel tank 2 is removed and retained on the tank cap 5 in such a manner that the internally threaded recess 10 is screwed onto the externally threaded projection 12 formed on the tank cap 5 of the oil tank 3. When oil is supplied into the oil tank 3, on the other hand, the tank cap 5 of the oil tank 3 is removed and retained on the tank cap 4 in such a manner that the externally threaded projection 12 of the tank cap 5 is screwed into the internally threaded recess 10 formed on the tank cap 4 of the fuel tank 2. If the tank caps 4 and 5 are engaged with each other through the internally and . externally threaded portions as described above, then safe retaining of the tank caps is further ensured by virtue of the engagement therebetween.

What is claimed is:

1. A tank cap retaining structure for use in a motorcycle, a small-sized marine craft or an agricultural machine in which a plurality of tanks, such as a fuel tank and an oil tank, are disposed side by side, said structure comprising:

tank caps of said tanks having respective outer surfaces which are formed such as to be capable of detachably engaging each other for the purpose of retaining said tank caps.

2. A tank cap retaining structure according to claim 1, wherein a projection is formed in the center of the outer surface of the tank cap of the oil tank, and a recess which is engageable with said projection is formed in the center of the outer surface of the tank cap of the fuel tank.

3. A tank cap retaining structure according to claim 1, wherein a recess which is engageable with the outer peripheral surface of the tank cap of the oil tank is formed in the center of the outer surface of the tank cap of the fuel tank.

4. A tank cap retaining structure according to claim 1, wherein an annular wall which is engageable with the outer peripheral surface of the tank cap of the oil tank is formed in the center of the outer surface of the tank cap of the fuel tank.

5. A tank cap retaining structure according to claim 1, wherein a ridge is formed on the outer surface of the tank cap of the oil tank, and a groove which is engageable with said ridge is formed on the outer surface of the tank cap of the fuel tank.

6. A tank cap retaining structure according to claim 1, wherein an externally threaded projection is formed in the center of the outer surface of the tank cap of the oil tank, and an internally threaded recess which is engageable with said externally threaded projection is formed in the center of the outer surface of the tank cap of the fuel tank.

* * * * *